(12) United States Patent
Chu et al.

(10) Patent No.: US 10,974,358 B2
(45) Date of Patent: Apr. 13, 2021

(54) SYSTEM FOR REPROFILING A WHEEL SET OF A RAILWAY VEHICLE

(71) Applicant: Simmons Machine Tool Corporation, Albany, NY (US)

(72) Inventors: Michael H. Chu, Melrose, NY (US); James G. Otton, Sand Lake, NY (US); Eric S. Butler, Sloansville, NY (US)

(73) Assignee: SIMMONS MACHINE TOOL CORPORATION, Albany, NY (US)

( * ) Notice: Subject to any disclaimer, the term of this patent is extended or adjusted under 35 U.S.C. 154(b) by 8 days.

(21) Appl. No.: 16/244,487

(22) Filed: Jan. 10, 2019

(65) Prior Publication Data

US 2019/0210175 A1 Jul. 11, 2019

Related U.S. Application Data

(60) Provisional application No. 62/616,209, filed on Jan. 11, 2018.

(51) Int. Cl.
| | | |
|---|---|---|
| *B23Q 15/013* | (2006.01) | |
| *B23B 5/28* | (2006.01) | |
| *B60B 17/00* | (2006.01) | |
| *B23C 3/04* | (2006.01) | |

(52) U.S. Cl.
CPC .............. *B23Q 15/013* (2013.01); *B23B 5/28* (2013.01); *B23C 3/04* (2013.01); *B60B 17/0055* (2013.01); *B23B 2215/36* (2013.01); *B23C 2215/36* (2013.01)

(58) Field of Classification Search
CPC ......... B32B 2215/36; B32B 5/28; B32B 5/08; B32B 5/02; B32B 5/04; B32B 5/32; B23C 2215/36; B23C 3/04; B23Q 15/013
See application file for complete search history.

(56) References Cited

U.S. PATENT DOCUMENTS

| | | | |
|---|---|---|---|
| 3,203,286 A | | 8/1965 | Dombrowski |
| 3,345,891 A | * | 10/1967 | Dombrowski ............ B23B 5/28 82/104 |
| 3,598,017 A | | 8/1971 | Saari |
| 3,938,254 A | * | 2/1976 | Miller, Jr. ................ G01B 7/28 33/203.11 |
| 4,200,012 A | * | 4/1980 | Wittkopp .................. B23B 5/28 82/1.11 |
| 4,276,793 A | * | 7/1981 | Wirtz ........................ B23B 5/32 82/1.11 |
| 4,674,370 A | * | 6/1987 | Gutohrlein ................ B23B 5/32 82/104 |
| 4,802,285 A | | 2/1989 | Ligacz et al. |

(Continued)

FOREIGN PATENT DOCUMENTS

| | | |
|---|---|---|
| DE | 1195138 B | 6/1965 |
| EP | 0685283 A1 | 12/1995 |

*Primary Examiner* — Nicole N Ramos
(74) *Attorney, Agent, or Firm* — Heslin Rothenberg Farley & Mesiti P.C.

(57) ABSTRACT

A system for reprofiling a wheel set of a railway vehicle allows the center of rotation of the wheel set to move relative to supporting rollers. A cutting tool used to reprofile the wheel profile on a wheel set is moved relative to the center of rotation of the wheel set to maintain a constant distance between the center of rotation and the cutter. The system avoids mechanically forcing a constant location of the wheel set relative to the center of rotation.

20 Claims, 13 Drawing Sheets

(56) References Cited

U.S. PATENT DOCUMENTS

| | | | |
|---|---|---|---|
| 5,561,242 A | 10/1996 | Naumann et al. | |
| 5,678,963 A | 10/1997 | Heimann | |
| 6,519,861 B1 * | 2/2003 | Brueck | B23Q 3/183 |
| | | | 33/200 |
| 2006/0168814 A1 * | 8/2006 | Reiche | B23B 5/32 |
| | | | 29/894 |
| 2011/0259162 A1 * | 10/2011 | Nakakubo | B23B 5/28 |
| | | | 82/104 |
| 2012/0067179 A1 * | 3/2012 | Ross | B23B 5/32 |
| | | | 82/1.11 |
| 2013/0192430 A1 * | 8/2013 | Ross | B23B 25/06 |
| | | | 82/1.11 |
| 2014/0144301 A1 * | 5/2014 | Naumann | B23B 5/32 |
| | | | 82/1.11 |

\* cited by examiner

SYSTEM FOR REPROFILING A WHEEL SET OF A RAILWAY VEHICLE

CROSS REFERENCE TO RELATED APPLICATIONS

This application claims priority to U.S. Patent Application Ser. No. 62/616,209 filed on Jan. 11, 2018, the entirety of which is incorporated herein by reference.

FIELD OF THE INVENTION

This invention relates to railway vehicle systems and more particularly to a system for reprofiling worn rail-vehicle wheels and wheel sets.

BACKGROUND OF THE INVENTION

Railway vehicles operate by using railway wheels which are guided and supported by rails affixed to the ground or other structures. Railway vehicle wheels are typically part of a wheel set which includes, at a minimum, a pair of wheels, an axle, and bearings. In addition, wheel sets are typically mounted on the bottom of a railway vehicle using a bogie or truck which, for example, may support four or more wheels. During operation of a railway vehicle (such as locomotives and railroad cars), their wheels become worn due to their contact with the rails upon which they ride. This wear often increases the risk of train derailment and may accelerate wheel wear or otherwise adversely affect the running characteristics of the wheels and railway vehicles. For example, the wheels of railway vehicles may, with wear, develop flat areas on their circumferences. Such wear often causes a bump or vibratory rotation of the worn wheel against the rail. Moreover, the contours of the wheels of railway wheel sets may be the subject to international standardization. Thus, especially with high-speed trains, the wheels should be periodically reprofiled to reduce or minimize worn areas and resultant bearing or bogie loads of the rail vehicles and the concomitant wear of rail surfaces.

Railway wheel sets may be reprofiled or trued with stock removal carried out, for example, by a turning or milling process. Thus, for example, peripheral milling machines, which are adapted to remove metal by feeding a workpiece through the periphery of a rotating circular cutter (such as a milling cutter), are often used. Typically the wheel set is cut by mechanically constraining the wheel set relative to its center of rotation and rotating the wheel set relative to a cutter to true the periphery of the wheel. However, supporting the wheel set to maintain a fixed center of rotation while rotating the wheel set or cutter to cut the wheel may be challenging. Alternatively, the milling cutters may be locked into a fixed radial position relative to the wheel set while allowing the centerline of the wheel set to move radially during the cutting process. However, locking the cutter into such a fixed radial position on the wheel set is also challenging and typically requires access to the centering holes on the ends of the axle.

It is therefore an object of this invention to provide a railway wheel truing or shaping system which is useable without physically locking into place the centerline of the wheel set, or locking the cutter into a fixed radial position relative to the wheel set centerline.

It is another object of this invention to provide a process for truing or shaping a railway wheel contour which allows for the movement of the center of rotation of the wheel or wheel set.

It is yet another object of this invention to provide a process for truing or shaping the contour of a railway wheel which compensates for movement or changes in the position of the center of rotation of the wheel and/or wheel set during the cutting process.

SUMMARY OF THE INVENTION

In accordance with aspects of the invention, there is provided a method of reprofiling a wheel set of a railway vehicle. The material includes rotating a wheel set while allowing a center of rotation of a wheel of the wheel set to move vertically and cutting the wheel to mill a profile on the wheel while moving the cutting tool towards the center of rotation of the wheel. The method also includes determining changes in position of the center of rotation while cutting the wheel and moving the cutting tool towards the center of rotation of the wheel based upon the changes in position of the center of rotation. The cutting tool may be moved towards the center of rotation of the wheel towards and to a constant distance. The constant distance may correspond to the desired radius of the reprofiled wheel.

In another aspect, the method may involve disposing a wheel set on one or more rollers; determining a center of rotation of a wheel on the wheel set; rotating the wheel; determining a desired constant distance between a cutting tool and the center of rotation of the wheel; activating a cutting tool on the wheel to mill a profile on the wheel and allowing the center of rotation of the wheel to move relative to the rollers; and moving the cutting tool towards the desired constant distance between the cutting tool and the center of rotation of the wheel to help facilitate maintaining the desired constant distance during the cutting process. The method also may include tracking or monitoring changes in position of the center of rotation of the wheel after the wheel has been rotated and the cutting tool has been activated, and measuring a distance corresponding to the distance between the rollers and the center of rotation. The measured distance may include both the vertical and horizontal distances between the one or more rollers and the center of rotation. The cutting tool may be moved in response to the measured distance. The position of the center of rotation of the wheel may be tracked or monitored using a tracking device. The method may be performed when the wheel set is removed from the railway vehicle and/or the wheel set is attached to a bogie.

In another aspect, the invention encompasses an apparatus for reprofiling a wheel set of a railway vehicle. The apparatus includes a station having rollers configured to support the wheel set while allowing a center of rotation of the wheel to move relative to the rollers. A cutting tool is operatively connected to the station and is moveable relative to the rollers and into a position to cut or mill a profile onto a wheel of the wheel set. A tracking device is connected to the station to sense the position of the center of rotation. A control system is connected to the station and the tracking device. The control system is configured to control the position of the cutting tool relative to the center of rotation of the wheel and to facilitate movement of the cutting tool, and move the cutting tool, to help maintain a constant distance from the center of rotation.

The control system may be configured to calculate a distance corresponding to the distance between the rollers and the center of rotation of the wheel, and configured to move the cutting tool based on such distance. The control system may be configured to receive information from the tracking device to track the center of rotation of the wheel after the cutting tool is activated. The station may include a mechanism configured to contact the wheel set and maintain the wheel set on the rollers while allowing the center of rotation of the wheel to move relative to the rollers. The station may be configured to support a wheel set attached to a bogie.

The apparatus may include a second cutting tool operatively connected to the station. The second cutting tool is moveable relative to a second set of rollers and positioned to cut or mill a profile onto a second wheel of the wheel set. A second tracking device is connected to the milling station to sense the position of a center of rotation of the second wheel. The control system may be operatively connected to the second tracking device and be configured to control the position of the second cutting tool relative to the center of rotation of the second wheel to move the second cutting tool towards a constant distance from the center of rotation of the second wheel, and to facilitate maintaining the constant distance during the cutting process. A single station may be configured to cut multiple wheels and wheel sets according to the procedures described herein. Also, multiple stations may be used simultaneously to reprofile multiple wheels simultaneously. Each station may be controlled by the same or a separate control system.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DETAILED DESCRIPTION

Figure 1:
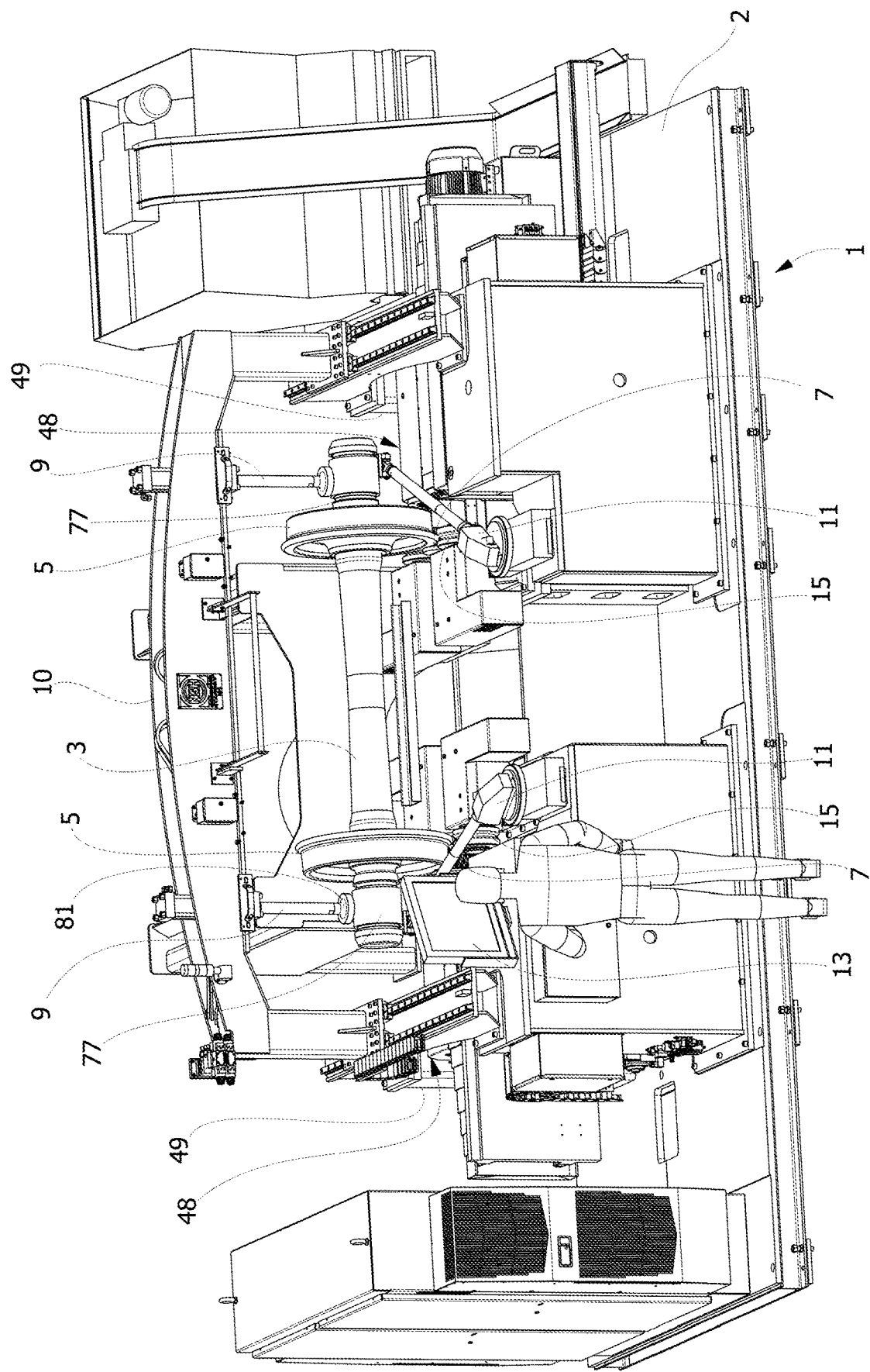
FIG. 1 is an isometric representation of a system for reprofiling worn rail vehicle wheels and wheel sets in accordance with the principles of the present invention.

Referring to FIG. 1, a system for reprofiling the wheels and wheel set of a railway vehicle is shown. The system 1 includes a station 2 which supports a wheel set 3 of a railway vehicle. The wheel set 3 includes a pair of wheels 5. Wheels are supported each on rollers 15, one or more of which may be drive rollers. The rollers 15 are supported or directly disposed on stationary brackets anchored to the station 2. The stationary brackets are configured to prevent axial and radial translation of the rollers 15 such that the rollers 15 rotate relative to the stationary brackets. Each end of the wheel set 3 is positioned using a hold down mechanism 9. The hold down mechanisms 9 allow the center of rotation of the wheel set and wheels to move in the vertical and/or horizontal directions. Accordingly, the wheel set hold down mechanisms 9 do not chock the wheel set in a fixed position relative to the station 2 and/or rollers. A pair of tracking devices 11 are incorporated into the station 2 and are used to measure and track the movement of the wheel set 3 and its center of rotation of each wheel 5. A control system 13 is included within the system and operatively connected to the drive rollers to drive and rotate the same when desired. Activation of the drive rollers will cause the wheel set 3 and wheels 5 to rotate.

Referring still to FIG. 1, the control system 13 is also operatively connected to the cutters 7 to activate the same. The control system 13 is also coupled to the tracking devices 11 in order to track the position and change of position of the center of rotation of the wheels 5 and wheel set 3 when the wheels rotate during the cutting process. The system also includes profile measurement devices 51 (shown in FIG. 12) which are operatively connected to the control system 13. The profile measurement devices 51 measure the outer profile of the wheels 5 and are integrated and/or connected to the control system 13 to calculate the center of rotation of the wheels 5 and wheel set 3 including prior to activation of the cutters 7. The cutters 7 are moveable to contact the wheels 5 to mill a profile onto the outer circumference of the wheels. The control system 13 controls the movement of the cutters 7 and their speed and torque. The cutters 7 are each connected to a carriage assembly mechanism 48 (see FIG. 12) which allows the cutters to move, preferably, in both the vertical and horizontal direction. Although, however, the system may operate by moving a cutter 7 in only the vertical direction.

Figure 2:
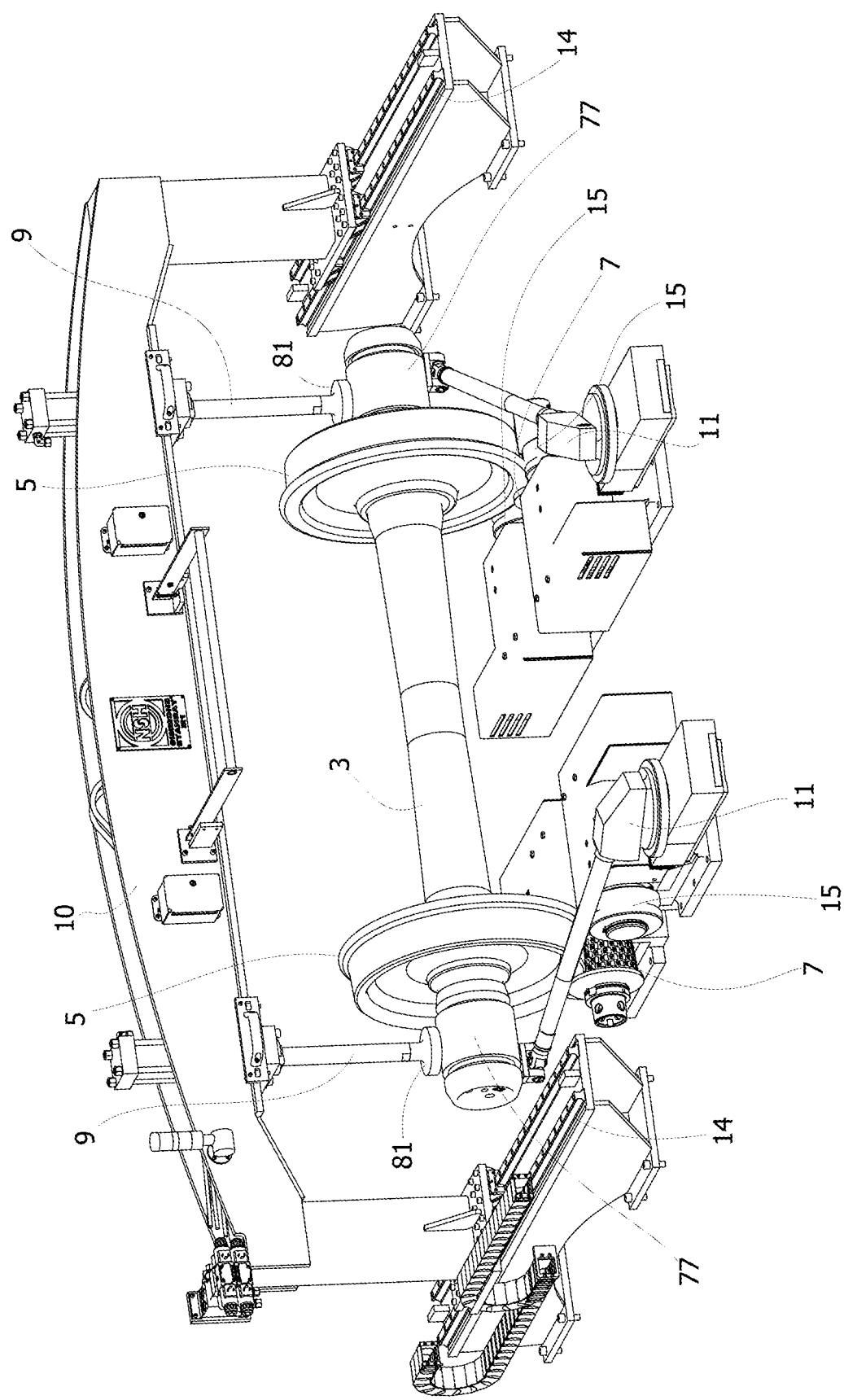
FIG. 2 is a schematic isometric representation of certain components of a system for reprofiling worn rail vehicle wheels and wheel sets in accordance with the present invention.

A simplified representation of the system 1 in accordance with the invention is shown in FIG. 2. The wheel hold down mechanisms 9 contact the outer ends of the wheel set 3 to maintain the same on the rollers by applying a downward force on the wheel set 3 while allowing the wheel set 3 to move vertically and/or horizontally so that the center of rotation of the wheels 5 and wheel set 3 may move relative to the station 2. The hold down mechanisms 9 are part of an overhead bridge assembly 10 which is moveable along a pair of tracks 14 parallel to the direction of rotation of the wheel set 3. This system allows the overhead bridge assembly to move away from the rollers 15 to place the wheelset thereon, for example, using an overhead crane (not shown).

Figure 3:
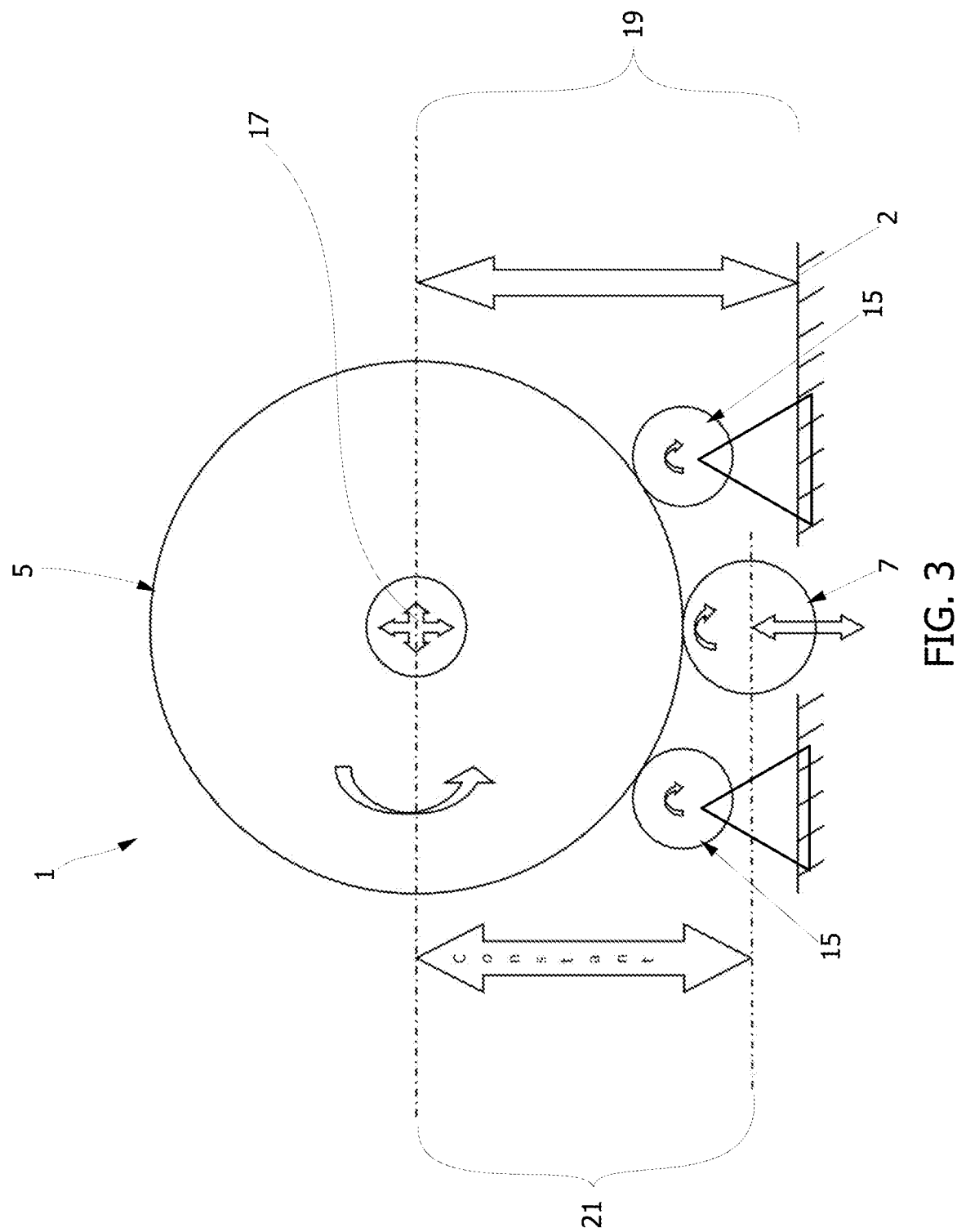
FIG. 3 depicts a schematic representation of the orientation of a wheel and wheel set of a rail vehicle and certain components when used in accordance with the system for reprofiling worn rail vehicle wheels and wheel sets in accordance with the present invention.

Referring now to FIG. 3, a simplified schematic representation of certain components of the system for reprofiling a wheel set of a railway vehicle is shown. Although one wheel is shown in FIG. 3, multiple similar or identical components may be used to shape the profile of multiple wheels. Moreover, each component may be controlled by the same control system 13. The wheel set 3 is mounted on the station 2 by placing each wheel 5 on a set of rollers 15. One or more of the rollers 15 may function as drive rollers to rotate the wheel 5, for example, in the counterclockwise direction. The cutter 7 is moveable in the vertical and horizontal direction and relative to the rollers 15 and the station. Each wheel 5 and wheel set 3 has a center of rotation 17, which as discussed herein, is calculated prior to activation of the cutter and prior to reprofiling the profile of the wheel 5. A profile measurement system, as also described below, is used to measure the profile of the wheel 5 and calculate the center of rotation 17. The control system is operatively connected to the cutter 7 to move the cutter in the horizontal and vertical direction via the carriage assembly mechanism controlling the position of the cutter. Based upon the location of the center of rotation 17, the control system determines a desired constant distance 21 between the center of rotation of the wheel 5 and the center of rotation of the cutter 7. This desired constant distance 21 represents the desired radius of the wheel and should be maintained throughout the cutting cycle and the rotation of wheel 5 by the one or more drive rollers. The control system 13 facilitates maintaining the constant distance 21 between the center of rotation 17 and cutter 7 by controlling the position of the cutter as the position of the center of rotation 17 changes during the rotation of the wheel 5. In this way, the cutter may be maintained at the desired constant distance from the center of rotation of the wheel. And, the wheel can be cut to a constant radius.

Figure 4:
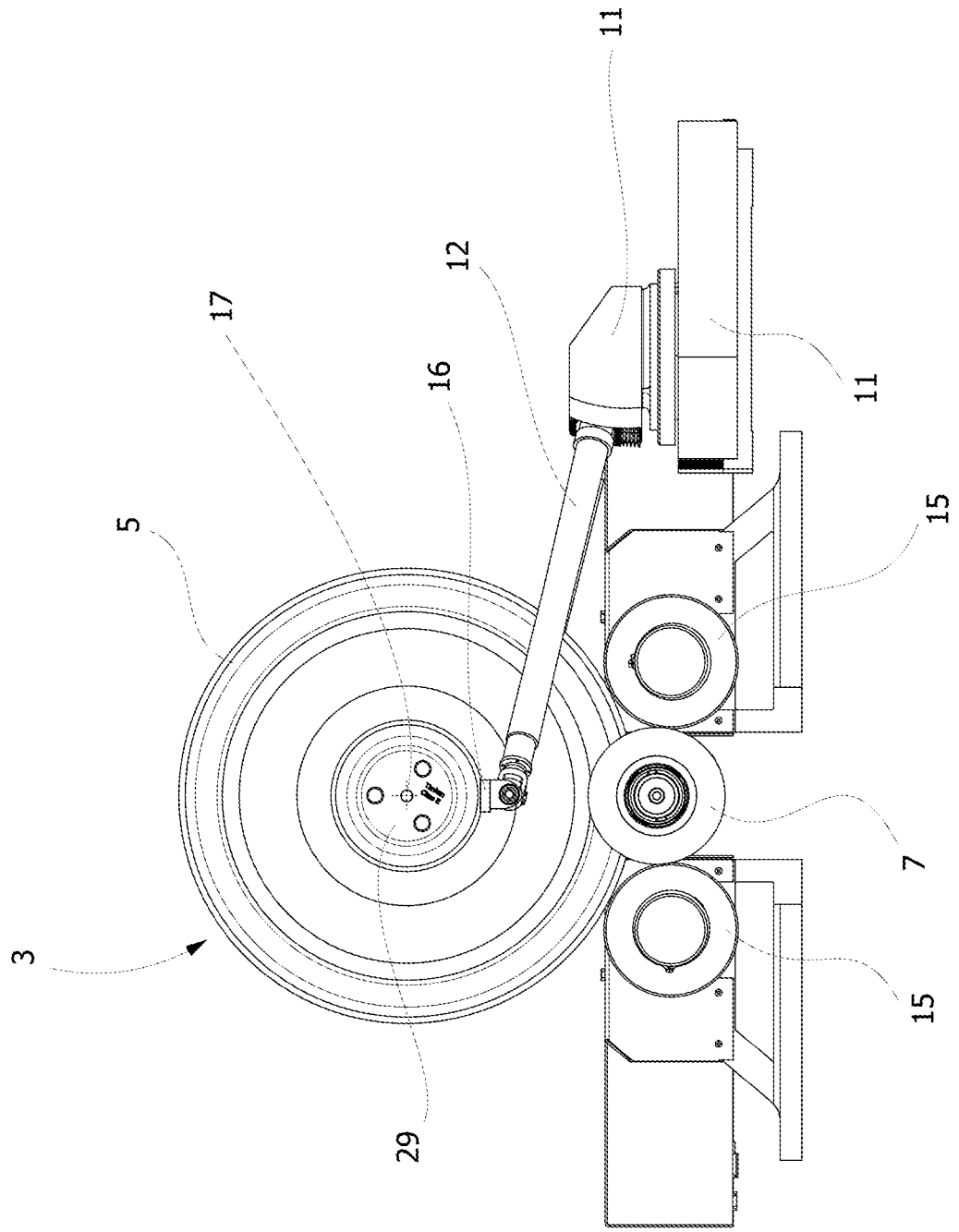
FIG. 4 depicts a schematic representation of a wheel set and tracking device useable in a system for reprofiling worn rail vehicle wheels and wheel sets useable in accordance with the present invention.

Referring to FIG. 4, tracking device 11 is used to determine the change of position of the center of rotation 17 as wheel 5 rotates. Tracking device 11, may contact the outer portion (or other area) of the wheel set 3 near the center of rotation 17 so as to track the movement of the center of rotation 17 in the vertical and horizontal direction. The tracking device 11 may also track the movement of the wheel set 3 in the direction parallel to the centerline of the axle (i.e., side-to-side on the machine). This information is used to keep the cutters 7 aligned with the wheel 5 in the event that the wheel set 3 moves in the side-to-side direction within the limited axial float of the drive rollers. This may be used in lieu of an axial guidance system which is intended to prevent that same side to side movement of the wheel set 3. The tracking device 11 transmits a signal to the control system representative of the change of position of the center of rotation 17. The control system 13 may then calculate the change in position of the center of rotation 17 relative to the rollers (or any other fixed location on the station 2) and calculate distance 19 (FIG. 3) between the station 2 and the center of rotation 17. Based upon the distance 19 as calculated by the control system 13, and upon the change in the position of the center of rotation 17, the control system 13 will move cutter 7 in the vertical and horizontal direction, if necessary, to maintain constant distance 21 (FIG. 3) between the center of rotation 17 and the cutter 7.

The process of cutting the wheel commences by the control system 13 activating a drive roller to rotate the wheel and wheel set. The drive roller, for example, may rotate the wheel one rotation in about seven minutes during which time the cutter cuts the outer profile of the wheel. The system thus allows for a slower more controlled cut of the wheel, as compared to a high speed rotation turning process. Tracking device 11 may contact the wheel set axle 29 directly or any part of the system that is coupled directly to the movement of the axle's center of rotation 17 such as the hold down system 9 (not shown). The tracking device 11 may sense movement of the outer position of the axle 29 which corresponds to a change in position of the center of rotation 17. The control system may then calculate the change of position of the center of rotation 17 to adjust the position of the cutter 7.

Figure 5:
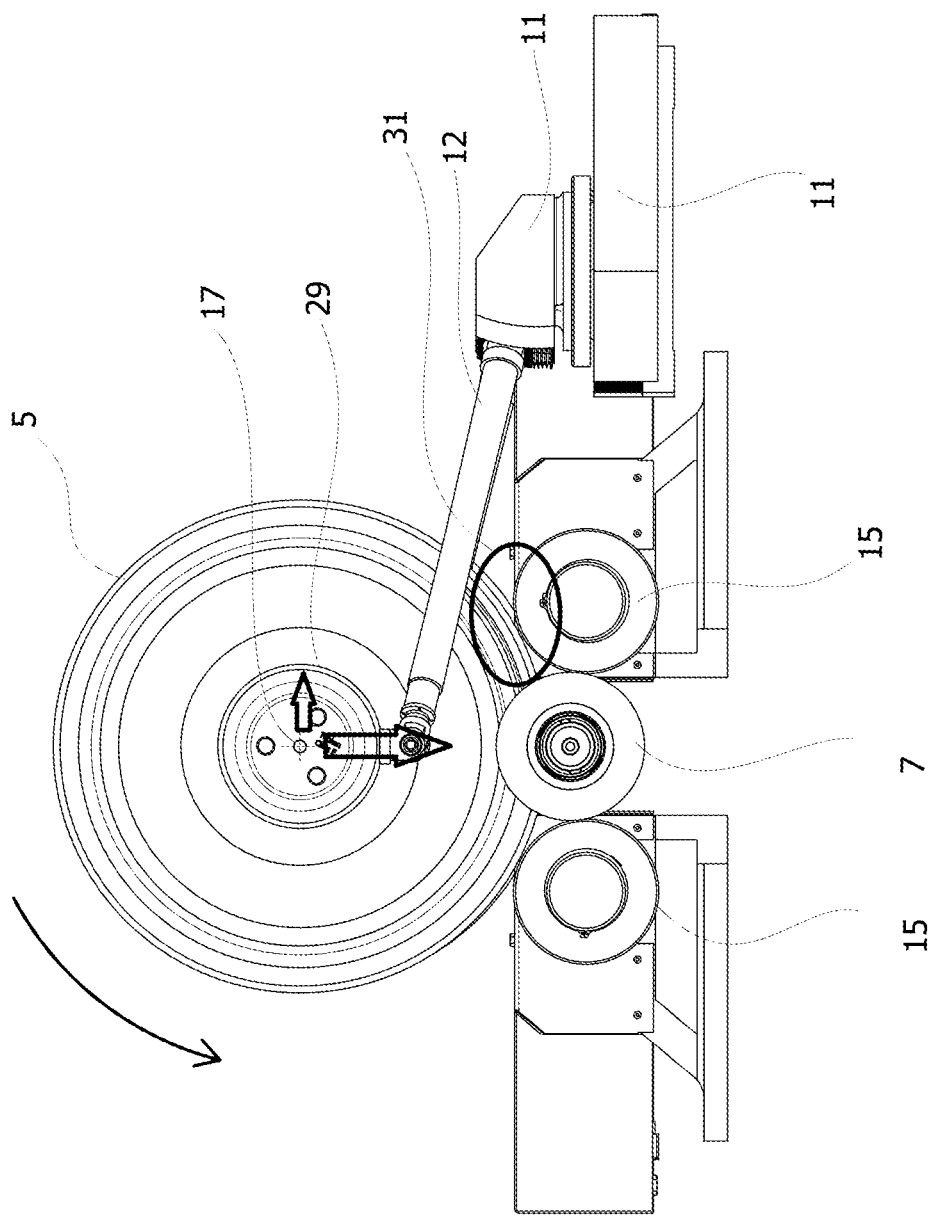
FIG. 5 depicts a schematic representation of the wheel set and tracking device of FIG. 4 as the wheel set turns counterclockwise during the cutting process in accordance with the present invention.

Referring now to FIG. 5, as the wheel 5 continues to rotate counterclockwise by drive rollers 15, the cutter 7 will continue to cut or mill a profile into the outer periphery of the wheel 5. Thus, a newly cut surface of the profile of the wheel 5 will move counterclockwise as the wheel 5 turns such that the cut profile of the wheel 5 will contact the drive roller 15 at location 31. As this occurs, the center of rotation 17 of the wheel 5 will move towards the roller 15 and towards location 31, namely, downwardly and to the right. As this occurs, the tracking device 11 will sense the outer position of the axle (and changes thereto) and thus the center of rotation 17 of the wheel 5 and wheel set 3. The control system will calculate the distance 19 (as shown in FIG. 3) and adjust the position of the cutter 7 to maintain the cutter at constant distance 21. The distance moved by the cutter will be the difference between the constant distance 21 and the calculated or measured distance 19, as shown in FIG. 3.

Figure 6:
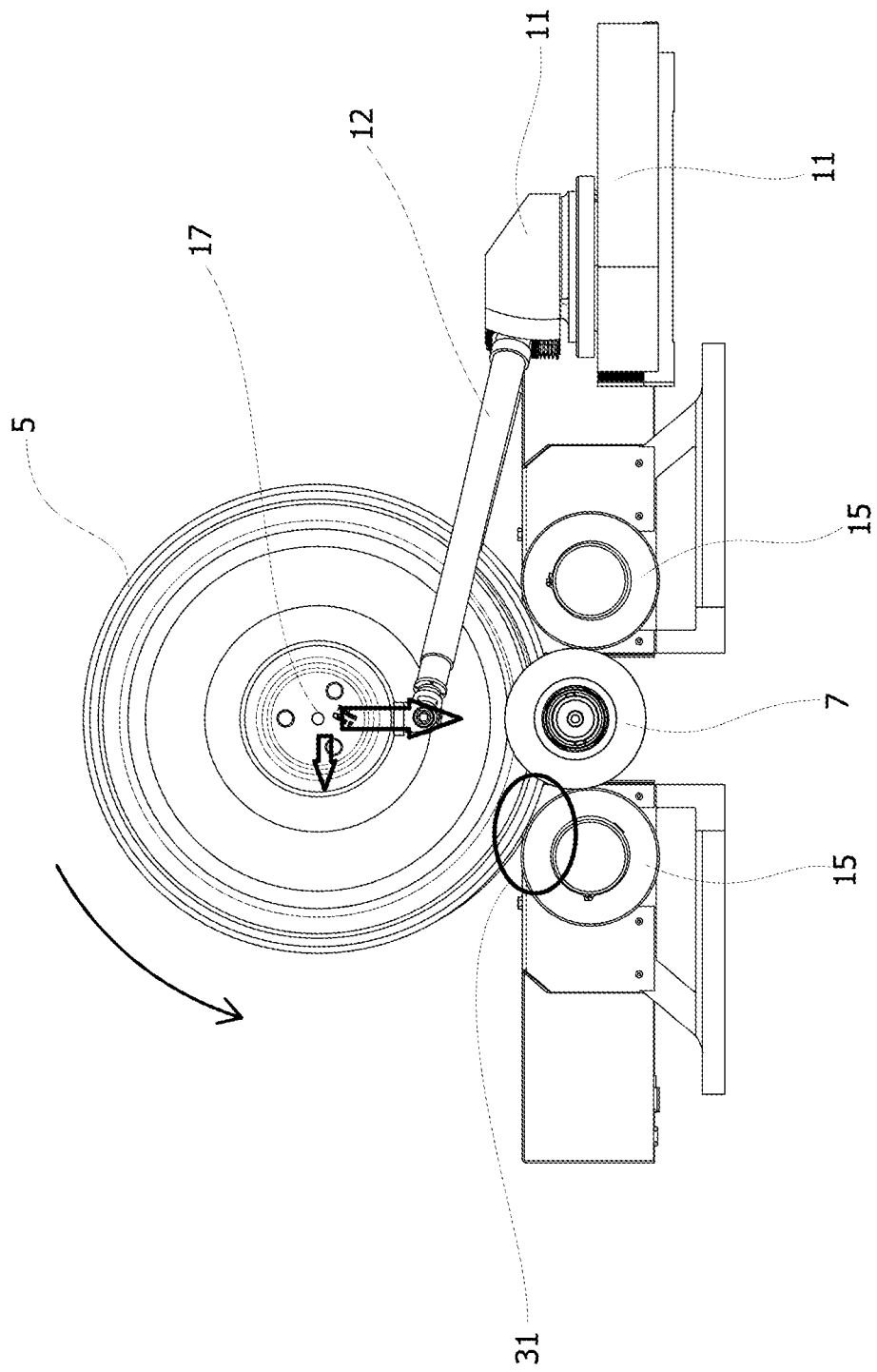
FIG. 6 depicts the wheel set and tracking device of FIGS. 4 and 5, as the wheel has been rotated counterclockwise a full rotation during the cutting process.

Referring now to FIG. 6, as the cutter continues to cut the wheel 5, the tracking device 11 continually tracks the center of rotation 17 and senses the change in position of the center of rotation 17 so that the control system may adjust the position of the cutter 7 to maintain the constant distance 21 between the center of rotation 17 and the cutter 7. When the wheel 5 completes a full rotation such that the cutter 7 cuts a profile into the entire circumference of the periphery of the wheel 5, the resultant profile facilitates a circular profile of the wheel. If desired, the profile measurement system may re-measure and calculate the profile of the wheel and one or more additional cutting cycles or rotation may be performed. The cutting of a single wheel profile as shown and described with reference to FIGS. 3-6, may be performed on multiple wheels of wheel set on a single station (as shown in FIG. 1).

Figure 7:
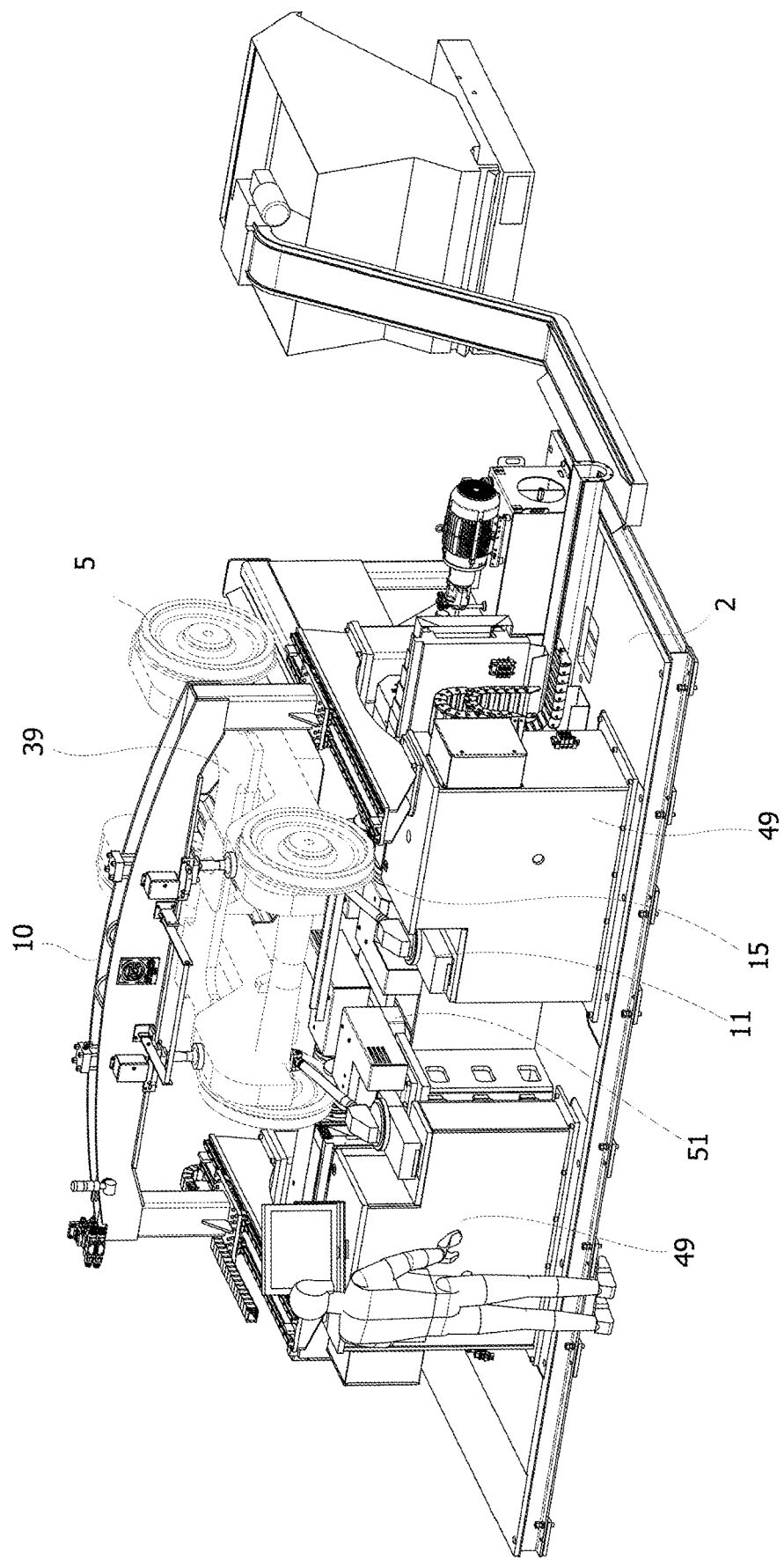
FIG. 7 depicts an isometric view of a system for shaping worn rail vehicle wheels and wheel sets mounted on a bogie or truck of a railway vehicle in accordance with another embodiment of the invention.
Figure 12:
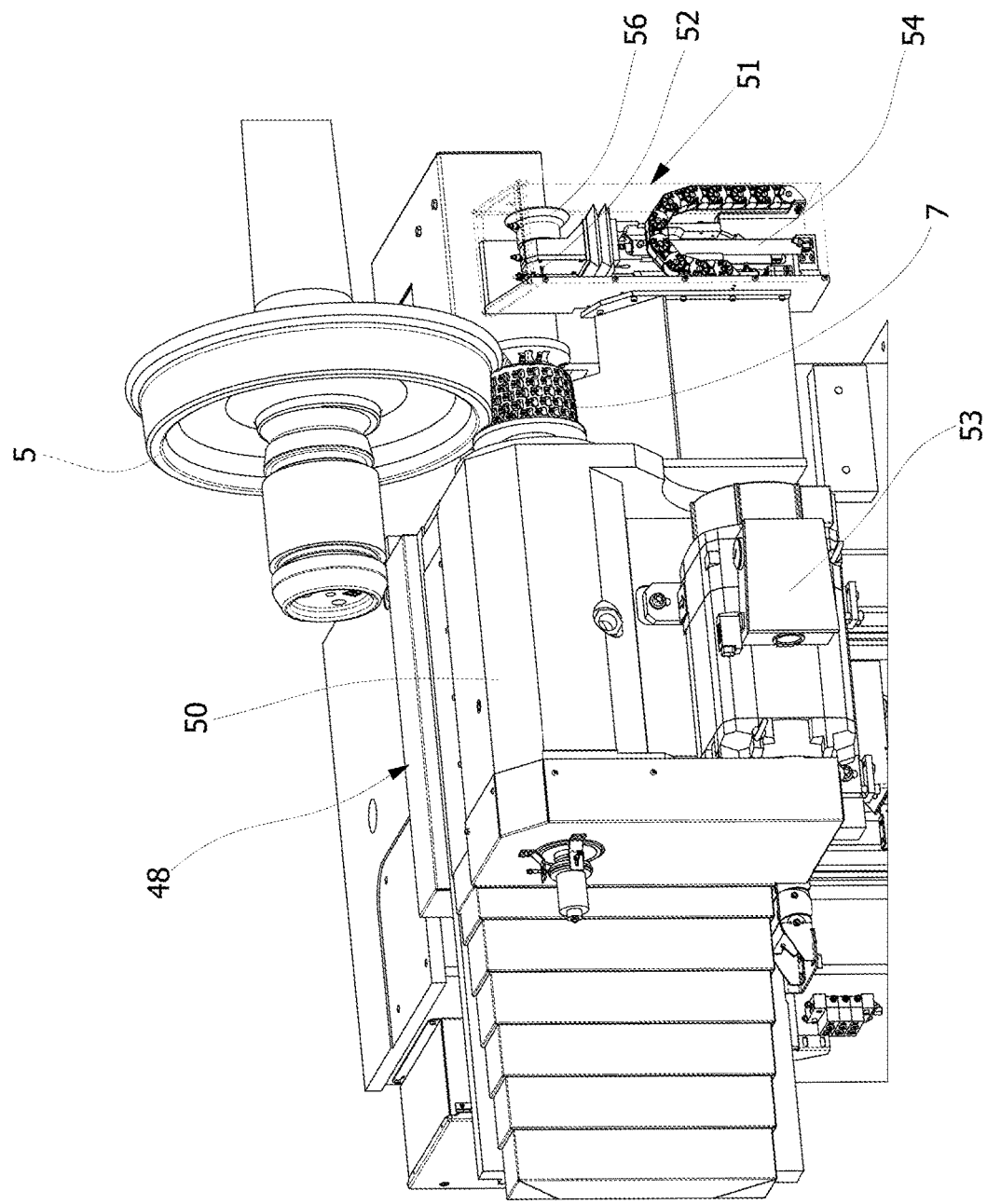
FIG. 12 depicts an isometric view of a spindle carriage having a cutter and profile measurement device within a system for reprofiling worn rail vehicle wheels and wheel sets in accordance with the present invention.

Referring to FIG. 1, the station 2 includes rigid base platform which supports left hand and right hand column assemblies 49, the cutting system, hold down mechanisms 9, wheel profile measurements device or system 51 and tracking device 11. Rail tracks may be incorporated into the system for transport of the wheel set (as shown in FIG. 7). The station includes a pair of two-axis moveable carriage assemblies 48 as shown in FIG. 12, each of which moves the cutter 7 and a profile measurement device 51. A carriage 50 is included in each carriage assembly and may be moved, for example, using ways which may be actuated for example, by heavy duty, servo-driven ball screws. Each way may include a precision absolute encoder on each axis of movement, namely, the horizontal and vertical direction for position feedback. Each carriage 50 carries a complete cutter 7 and a wheel profile measurement system 51. Each precision cutter 7 may be driven by a gear motor 53 connected thereto by a belt, shafts or a direct drive.

As shown in FIG. 1, rollers 15 may have V shaped grooves and be semi-floating axially to account for variation in the dimension of a wheel set 3 and changes in the shape of the wheel flange as the surface is cut. The drive rollers may be powered by, for example, servo gear motors (not shown) enabling high responsiveness, precise feed rate control, and monitoring of cutting loads. Such servo gear motors may allow the wheel set to be rotated at a higher speed during the profile measuring steps (described herein) to reduce cycle time while still providing accurate control of the low rotation speeds required for the cutting process. The space between a set of rollers 15 supporting one wheel 5 may be adjustable to allow for the cutting of a full range of different wheel diameters.

Figure 13:
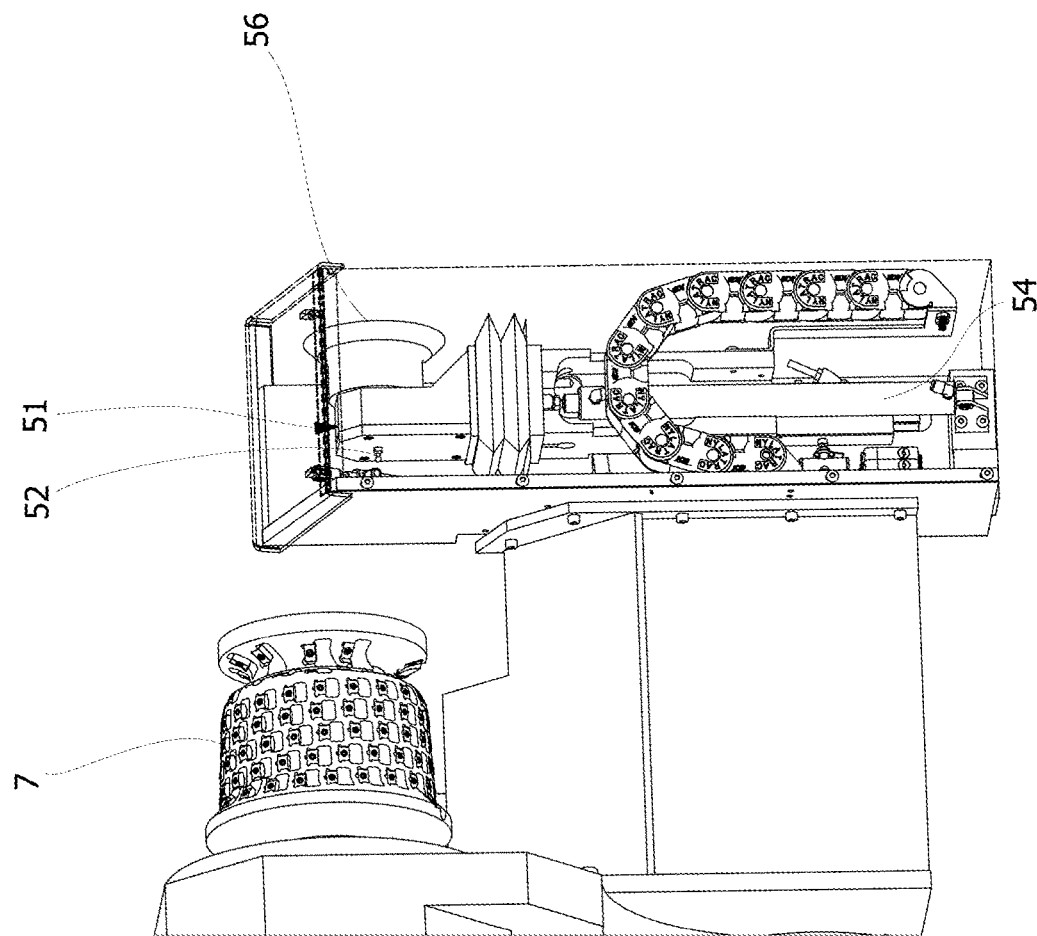
FIG. 13 depicts an isometric view of a profile measuring device incorporated as part of a profile measuring system used within the system for reprofiling worn rail vehicle wheels and wheel sets in accordance with the present invention.

Referring to FIGS. 12 and 13, the system includes an integrated automatic wheel profile measurement system or device 51 at each wheel, which is mounted onto the carriage assembly 48. Each wheel profile measurement device 51 measures wheel location, diameter, width, and profile as well as wheel set back-to-back, back face runout, and radial runout of the wheel tread. When a worn wheel 5 is probed using the wheel profile measurement device 51 such information is used to automatically determine the center of rotation of the wheel 17 and the desired target diameter or distance to cut the wheel profile and automatically position the cutters 7 axially for a particular wheel set. Each wheel profile measurement device 51 may be used, if desired, to complete a post-process wheel set inspection and measurement where, for example, final diameters, profile conformity, etc. can be verified and sent to the control system or other data management system.

Once the wheel profile measurement device 51 has been used to determine the initial position of the wheel set, the tracking devices 11 are then used to follow movement of the wheel set during the cutting or milling process. As shown in FIGS. 4-6, the tracking devices 11 include following arms 12 and adapters 16, one near each wheel. Alternatively, for example, if the system is configured to reprofile a wheel set still affixed to a bogie 39 (as described herein and shown in FIG. 7), the following arms 12 and adapters 16 of the tracking device 11 may contact a target area on the wheel axle (or bogie 39 that is directly coupled to the wheel set i.e., on the wheel set side of any bogie suspension). And, each following arm 12 may be manually or automatically positioned under that target area. Each tracking device 11 and following arm 12 may also be equipped, for example, with a pneumatic cylinder which extends the device and/or arm 12 until the adapter contacts the target area and holds it against same throughout the cutting cycle. In the case of a wheel set not coupled to a bogie as shown in FIG. 1, the following arm 11 may be attached to the hold down mechanisms 9. The following arms may be fitted with precision encoders 18 which are used to monitor movement of the wheel set and enable the control system to adjust the radius at which the cutters 7 are engaging the wheel 5. The tracking devices 11 may be allowed to move in three dimensions, i.e., along an X, Y and Z axis. The end of the following arm 11 opposite the probe may be connected to a block which slides along the X and Z axis, i.e., in the front to back and side to side direction. And, the arms 12 are free to move in the up and down direction. Precision encoders within the tracking device can then determine movement of the wheel and its center of rotation in three dimensions. And, the device 11 can send signals representing the probe positions or changes thereof, which correspond to changes in position of the center of rotation of the wheel, to the control system which can control movement of the cutter 7 position. Also, a universal joint may be used between the top end of the arm 12 and the adapter 16. This may allow encoded angular motion to be measured in the vertical, horizontal and front to back planes via the universal joint.

Referring to FIG. 1 and FIG. 2, the overhead bridge 10 supports a pair of wheel hold down mechanisms 9. The wheel hold down mechanisms 9 may include a pair of arms or posts which extend from the station 2 and contact, for example, the outer portion of the wheel 5 and wheel set 3. The arms each include a contact pad 81 which contacts the axle or cartridge roller bearing housing 77. The pad and/or arm is allowed to move vertically to compensate for movement in the center of rotation of the wheel or wheel set. For example, the arm may be extendable and/or include a hinge which allows the contact pad to move while still contacting the wheel set. The area and/or hinge may be biased to apply a force downwardly on the wheel set to assist in maintaining the wheels and wheel set on the rollers. The force should be sufficient to allow the center of rotation of the wheel set to move while maintaining the wheel set on the rollers. In the embodiment shown in FIG. 1, the tracking devices 11 contact the axle or cartridge roller bearing housing 77 to track its movement and the corresponding movement in the center of rotation of each wheel 5. However, other techniques for holding the wheel set 3 on the rollers while allowing the center of rotation to move and without chocking the wheel set 3 may be used.

An alternative embodiments of wheel hold down mechanisms 9 may include a pair of arms which extend from the station 2 towards and receive the outer end of the axle and wheel set. The arms may be moveable in multiple dimensions and rotatable relative to the station. The arms may each include curved contact pads 87 which receives the top portion of outer wheel hub. The contact pads are preferably curved in shape and sized to fit the top portion outer portion of the wheel set. The curved contact pads 87 are also allowed to move horizontally to compensate for movement in the center of rotation of the wheel or wheel set. For example, the contact pads may include a rail which moves horizontally within a slot of the arm. In addition, the arms are moveable vertically to adjust to any vertical movement of the wheel. In this embodiment, the tracking device 11 may contact the bottom of the wheel hubs 77 to track and measure its vertical and horizontal movement and the corresponding movement in the center of rotation of each wheel 5.

Referring to FIG. 12 the details of a carriage assembly 48 are shown. The carriage assembly moves the cutter 7 and wheel measurement or probing device 51. The carriage assembly includes a moveable carriage 50, moveable in the vertical and horizontal (y and z) directions. The carriage 50 supports the cutter 7 used in accordance with the system described herein and wheel probing device or device 51. The carriage assembly 48 is moveable in the vertical and horizontal directions so as to move the cutter 7 towards the wheel 5 and wheel set 3 so that the cutter may contact the outer circumference and profile of the wheel 3. A motor 53 is used to drive the cutter 7 and rotate the same to allow the cutting process to occur. The carriage 50 and cutter 7 are controlled by the control system which may be activated and monitored by an operator. Coupled to the carriage 50 is the wheel profile measurement device 51 which is shown in more detail in FIG. 13. This device may include, for example, a precision roller 56 with a rotary encoder therein. A raised flange on the precision roller 56 may trace and contact the rotating wheel 5 on the wheel set 3. The wheel measurement device 51 is capable of measuring the entire wheel profile in the full axial direction, the thickness of the wheel and its entire circumference. Accordingly, the entire circumference of the wheel 5 in a wheel set 3 may be measured using the precision roller 56 along its entire circumference so as to calculate a full profile shape of the outer profile of the wheel 3. The control system 13 is coupled to the precision roller and rotary encoder as well as the carriage assembly 50 to measure the exact position and movement of the same. The control system controls one or more mechanisms and the carriage 50 to move the wheel measurement device 51 vertically and horizontally towards the wheel and wheel set.

A horizontal contact member or probe 52 may include, for example, ruby tips or small precision rollers on the inboard and outboard extents thereof such as to contact the inner and outer faces of the wheels 5. The position of the horizontal member or probe 52 is monitored by the control system using a precision length gauge such as the Keyance GT2-H32 available from Keyance Corporation of America. Such information combined with the vertical and horizontal position of the carriage assembly 48 and may be used by the control system 13 to locate and measure the wheel width and rim thickness. A linear guide 54 which may be pneumatically or hydraulically operated, may actuate in the vertical direction, and provides position feedback using a linear encoder or magnetostrictive transducer to measure the vertical position of the precision roller 56 and the horizontal member or probe 52. The linear guide 54 may also be coupled to the control system 13 to combine with the information derived from the precision roller 56 and horizontal member or probe 52 to provide precise measurements regarding the outer profile of the wheel 5 from its inner face to its outer face, along with the wheel thickness.

When a wheel set 3 is placed upon the system 1, the operator may commence an operation cycle for the same. The control system 13 may then extend the wheel profile measurement device 51 upward and towards wheel to facilitate taking various measurements. Initially, the center line of rotation of the axis of the wheel set may be calculated based on the position of the horizontal member or probe 52 and/or precision roller 56 contacting the bottom of the wheel and adding a half of the average diameter of the wheel as determined by measurement obtained from the information derived by the precision roller 56 and its rotary encoder.

Figure 8:
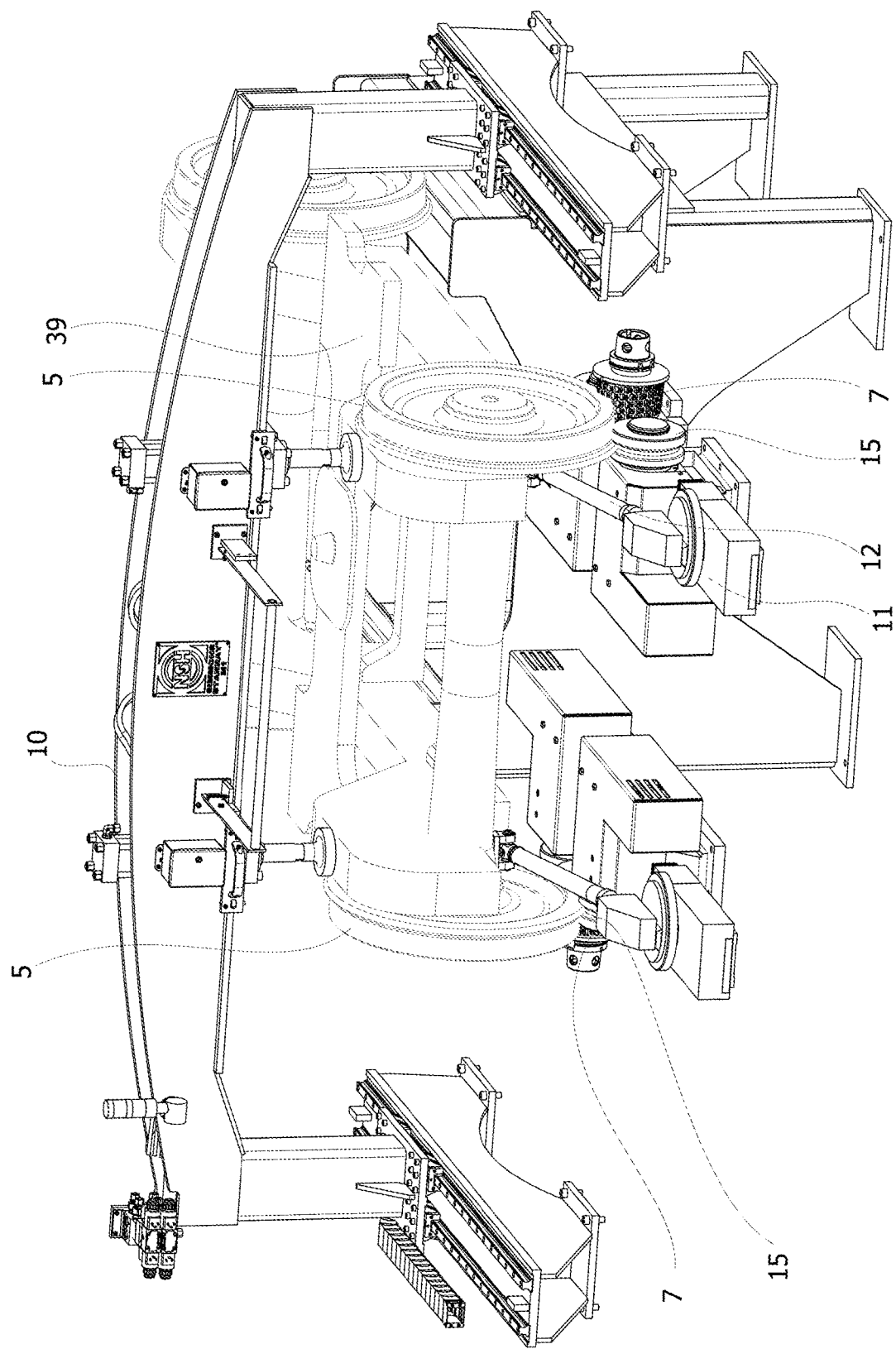
FIG. 8 depicts a simplified schematic representation of the system for reprofiling worn rail vehicle wheels and wheel sets of FIG. 7 including certain components thereof.

Referring now to FIGS. 7 and 8, an alternative system 1 for reprofiling a wheel set of a railway vehicle may be used to reprofile a wheel set which is located on a bogie or truck 39. The system of FIGS. 7 and 8, operates and is similar to the system described with respect to FIGS. 1-6. As shown in FIG. 8, the system 1 includes a station 2 which is capable of supporting a bogie or truck with the railway wheels and wheel sets thereon. The rollers 15 and cutters 7 operate in the same manner as described previously herein with respect to FIGS. 1-6. However, the tracking device 11 following arms 12 may contact the bogie 39 rather than the wheel set 3. In addition, the hold down system 9 is configured to contact the bogie 39 rather than the wheels.

When the system is used to reprofile wheel set within bogies, different types of an inboard hold down system may be used. For example, a hydraulically actuated system may pull down on the underside of the bogie frame after the operator has positioned an appropriate hook or adaptor. Also, some bogies and loose wheel sets may require hold downs positioned outside of the wheels in order to apply the hold down force to axle boxes, bearings, or other bogie features. A separate hydraulically actuated outboard hold down system may be used in such situations. Also, a support frame may be used to support the end of the bogie opposite of the wheel set being cut. The frame can either support the wheel set that is not being cut or it can be fitted with jacks to support the bogie frame if necessary to accommodate coupled wheel sets. When one wheel set cutting is complete, the bogie may be lifted off using an overhead crane, rotated and set back on the machine to complete the second wheel set. An on-demand hydraulic unit may be included to power the hold down system(s).

The control system 13 may include, for example, by a standard industrial PLC with basic motion control modules ensuring ease of use and ease of maintenance. A full-featured, PC-based user interface 13 (FIG. 1) gives the operator access to an appropriate set of simple screens for reviewing measured wheel set data, selecting processes to be completed, monitoring status, and operating the machine. Additional functionality (and password protectable screens) are provided for maintenance, data management, calibration, etc. Meaningful messages regarding status, interlock conditions, and faults are displayed to facilitate ease of use and efficient troubleshooting. Remote diagnostics connectivity and services are available subject to the customer's IT policies, service provider options, and desired level of support. A dedicated Ethernet port or other communication interfaces or techniques may be used for connection to the customer's network for storage of wheel set data in the customer's vehicle maintenance database.

Figure 9:
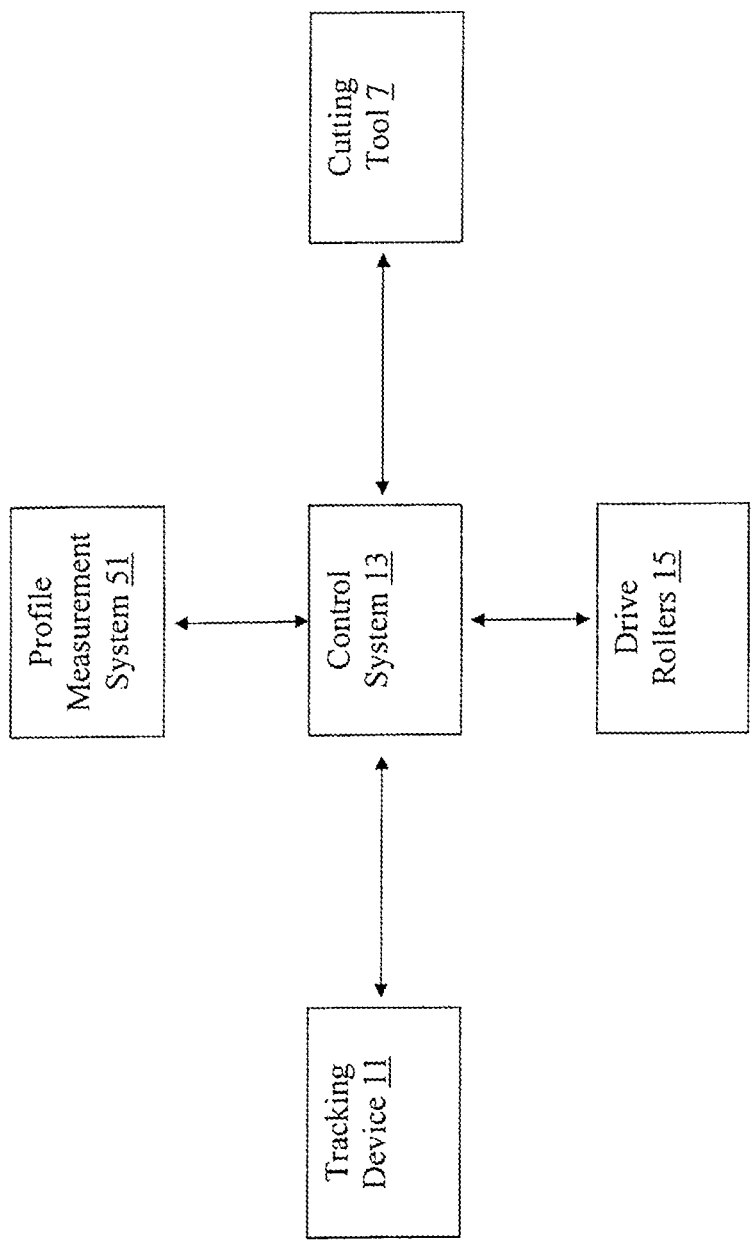
FIG. 9 depicts a schematic diagram of certain components or subsystems and their communication paths used in the system for reprofiling worn railway vehicle wheels and wheel sets of the present invention.

Referring now to FIG. 9, a schematic representation of certain components of the system 1 and their communication paths are shown. The control system 13 is operatively connected to each cutting tool 7 and carriage assembly 48 and their associated mechanisms to operate and move each cutting tool 7 to commence cutting of each wheel 5. The control system 13 is also operatively connected to each of the drive rollers 15 to control the operation of the drive rollers and rotate each wheel 5 of each wheel set 3. The control system 13 is also operatively connected to each tracking device 11 which tracks the position of the center of rotation of each wheel and wheel set 3. The control system 13 is also operatively connected to each profile measurement system or device 51 which measures the profile of a wheel before and/or after reprofiling. The control system 13 may calculate the center of rotation of each wheel 17 based upon the information obtained by each profile measurement system. Each system 1 include multiple cutters, each cutter corresponding to the cutting of a particular wheel of a wheel set. In addition, each system 1 may cut multiple wheel sets, if desired. A single control system 13 or multiple control systems may be used to determine the position of each cutter operated by the control system. In addition, multiple systems 1 may be controlled by a single control system.

Figure 10:
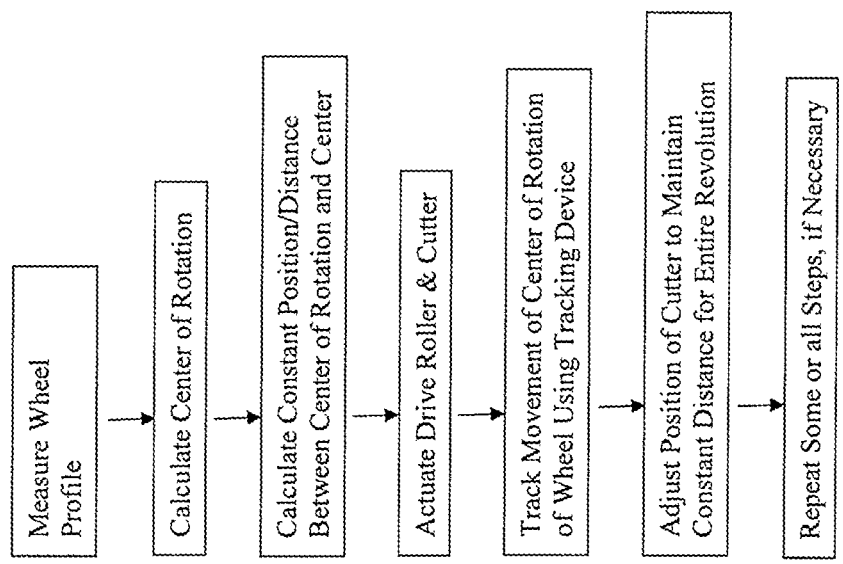
FIG. 10 is a flowchart depicting the process for reprofiling worn railway vehicle wheels and wheel sets conducted in accordance with the principles of the invention.

Referring to FIG. 10, the system performs a process with respect to each wheel 5 which is cut by a particular cutter 7. For each wheel, the system using one or more wheel profile measurement systems 51 corresponding to one or more wheels 5, will measure each wheel profile. The control system may then calculate the desired center of rotation of each wheel. After the center of rotation is calculated, the control system may then calculate the constant position or distance between the center of rotation of each wheel and a cutter so as to obtain the desired wheel profile after cutting. The control system may activate each drive roller and cutter associated with a particular wheel so as to rotate each wheel and contact the associated cutter with the wheel to create a new profile thereon. For each wheel being cut, the tracking device tracks the movement of the center of rotation of the wheel and the control system calculates the change of position or change in distance of the center of rotation of each wheel. The control system may then adjust the position of each cutter relative to the change of position of the center of rotation for the wheel that the cutter is milling. The process may continue for complete revolution of a wheel relative to a cutter. In addition, the process may be repeated if necessary over multiple revolutions for the same wheel.

The complete operating sequence for reprofiling a wheel 5 and wheel set 3 may be performed as follows. Initially a wheel set 3 (or bogie if attached to a wheel set) is placed directly onto the rollers 5 using, for example, an overhead crane. An axial guide system may then be used to, for example, to contact the bogie or individual wheel set as appropriate. Next, the operator may activate the hold down mechanisms 9 as necessary to apply a downward force. The control system maintains the hold down force for the balance of the processing of a wheel set. Next, wheel set following arms may be activated to contact either the bogie frame, hold down mechanism or wheel set. The operator may slide the tracking device following arms such that the actual contact point of the arm is lined up under the pre-defined area on the given bogie, hold down mechanism or the control system extends the following arms against the bogie, hold down mechanism or wheel set and automatically maintains contact and monitors movement of the wheel or wheel set throughout the balance of the cycle. A target, such as adhesive backed reflective tape may be applied to rim of one wheel to indicate position of a full wheel rotation. The operator may then confirm that the correct operations have been selected and wheel set type has been entered and then initiates the automatic processing cycle at the control station. The wheel probing device 51 measures wheel diameters, widths, locations, and wheel profile. The control system calculates the target or desired wheel diameters required to reprofile the wheel, the number of passes, and the depths of cut. The control system may also check against rim thickness condemning limits and verify that back-to-back wheel dimensions are acceptable. The control system then align cutters 7 to wheels along the Z-axis and controlling the system to perform one or more rough cutting passes on the wheels. The wheel probing devices may then measure wheel diameters prior to doing finish cut. Based upon such measurements, the cutter may make one finish cutting pass. The cutter may complete outside radius (if the cutter not configured with integral chamfer). If desired, the system may run a post-machining measurement cycle using the wheel probing devices, and the system may store and/or transfer of wheel set data. The operator may then remove the reflective target, releases and homes the following arms, hold downs, and axial guides. The wheel set and/or bogie may then be removed.

Figure 11:
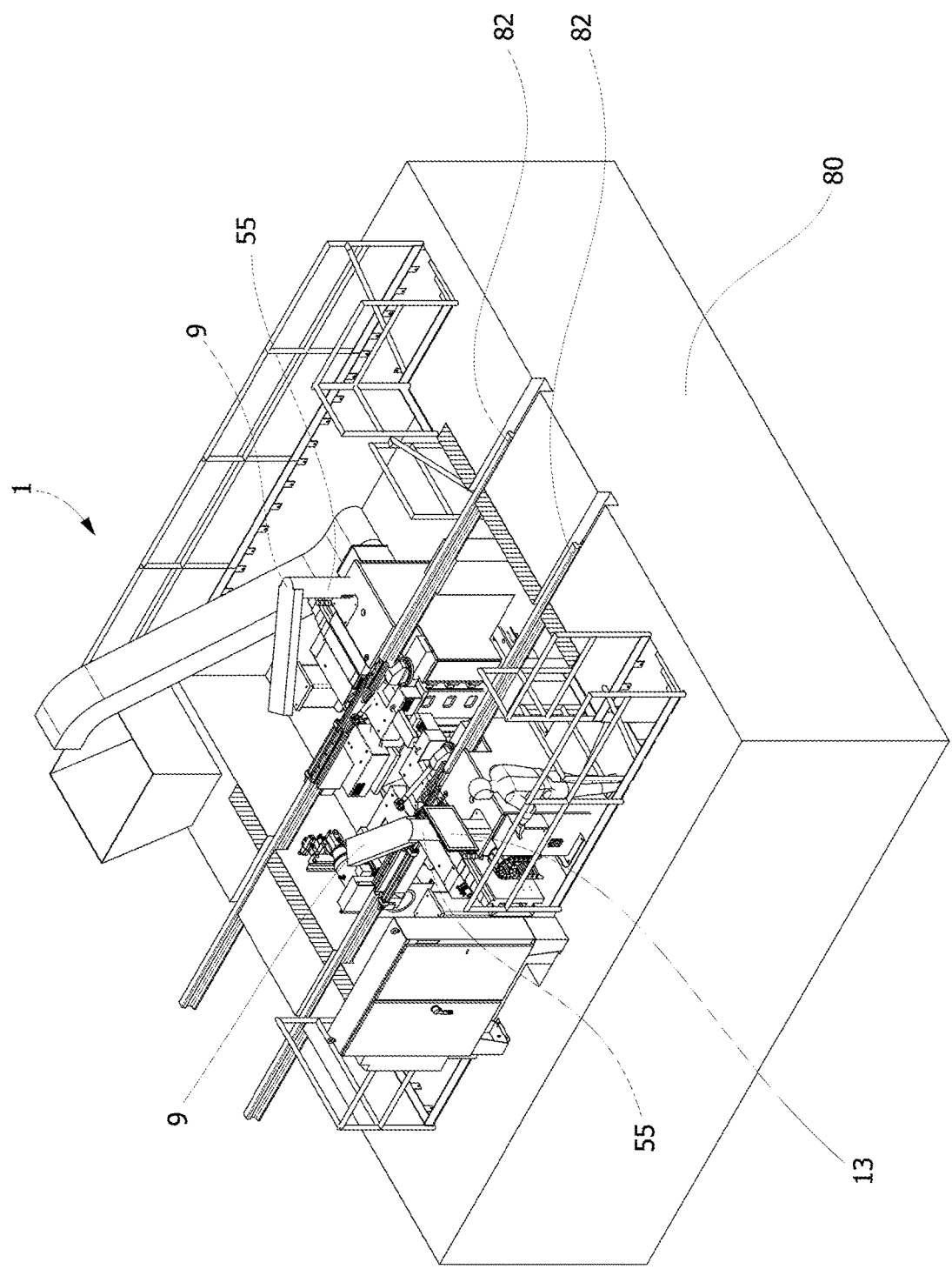
FIG. 11 is an isometric view of an alternative embodiment of the system for reprofiling worn rail vehicle wheels and wheel sets in accordance with the present invention where a railway vehicle may be rolled onto the system using rails

Referring to FIG. 11, a further embodiment of a system for reprofiling worn railway vehicle wheels and wheel sets where a railway vehicle (not shown) may be driven onto a set of rails located over a station. This embodiment operates similar to the embodiments described above, but measures and cuts a wheel set while still assembled to a rail vehicle. The station 2 may be installed in a pit 80 which allows a rail vehicle to be driven or pulled directly over the system via rails 82. These rails should be designed to carry in excess of 20 ton (180 kN) axle loads for rail cars and 45 ton axle loads for heavy locomotives. Once the vehicle is positioned over the station 2, the drive rollers may lift the wheel set up and a section of rail automatically retracts giving the cutter 7 access to the bottom of the wheel 5. In this embodiment, the hold down systems 9 include a pair of arms. The arms are pivotably mounted onto posts 55, which are vertically moveable. The hold down systems 9 include pads which contact the bogie (not shown) or wheel set (not shown). The pads are thus moveable by rotating the arms and translating the posts.

For the system shown in FIG. 11, the complete operating sequence may be as follows. When the system is initialized and the rails 82 are in place, the railway vehicle may be transported via the rails 82 to the system. A signaling system such as a green light may be used to inform the user that the system is ready for receipt of the railway vehicle. The vehicle can then be driven, shunted or winched via the rails 82 onto the rollers 15 of the system. The operator may then extend the axial guide system to contact the bogie or the rollers to contact the individual wheel set as needed. The operator may then initiate the hold down systems 9 to align with the bogie and initiate the hold down system 9 to apply the downward force onto the bogie. The control system 13 controls all operations and maintains the hold down force for the entire cutting cycle. Next, the user may actuate the wheel set tracking devices so that the following arms contact the bogie frame (or the wheel sets, if desired). The wheel set following arms contact the target area on the bogie frame, or an adapter may be used to facilitate such contact. The operator may apply a target indicator such as an adhesive backed reflective tape to the rim of a wheel to indicate visually when a full revolution of the wheel has occurred on the system during the cutting process. The operator may confirm the type including the size of wheel and wheel set onto the system and initiate the automatic cutting cycle at the control station. Once the automatic cutting cycle has been initiated, the rollers elevate and lift the wheel set off the rails. The rails may be slideable to automatically retract away from the rollers. The wheel measuring devices may then be actuated to measure the wheel diameters, widths, locations and the wheel profile. In this step, the desired target wheel diameter is calculated by the control system based upon such measurements to and the number of cut revolutions, depths of cut are calculated. In addition, the wheel rim thicknesses and limits including verification of back-to-back dimensions are performed. Next, the cutters align to the wheels along the horizontal and/or vertical axis and one or more rough cutting passes or revolutions are performed as determined by the control system. After a cutting cycle, the wheel diameters may be measured using the wheel measurement devices. If the control system determines that the measured wheel diameter is sufficient or close to the desired size and configuration, the system may perform one or more finished cutting rotations. The complete outside radius of the wheels may be additionally milled if the cutter is not configured with an integral chamfer. At the end of the cutting processes, a post-cutting measurement step may be performed using the wheel profile measurement systems and the wheel measurements and other data may be stored or transmitted by the control system. The operator may then remove the reflective tape or other target indicia and release the following arms, hold down and axial guides. The vehicle may be advanced to the next wheel set thereon and the entire process repeated for an additional wheel set on the vehicle.

Wheel set milling cutter heads, or other milling cutters which duplicate the wheel shape desired in part or whole, may be used as cutters 7. For example, a Stanray TN-84 cutter available from Simmons Machine Tool Corporation of Albany, N.Y. may be used with the system described herein However, other suitable cutters may be also be used. Each precision cutter 7 may be driven by a direct-drive 30 hp gear motor attached via a spindle or shaft. The spindle may be supported by multiple heavy precision bearings mounted, for example, in a cast iron housing. Each cutter 7 may include a machined body with a number of removable bars. Each of these bars is designed to hold a number of indexable, replaceable carbide cutting inserts arranged in such a way as to form a continuous cutting helix which yields the desired tread profile. These insets can be easily indexed without removing the cutter from the machine. The cutters can easily be removed from the machine to swap cutters or index inserts. The cutters are also designed with a set of cutting inserts on the end of the cutter. This enables the cutting of a chamfer or radius tangent to the outside face of the rim based on the probed wheel width and location.

Although the invention has been described with reference to the embodiments depicted herein, it is apparent to one skilled in the art that various modifications may be made without departing in any way from the spirit of the invention. For example, various other adjustable spacer configurations may be used. Any such modifications or configurations are intended to be within the scope of the invention as defined in the following claims.

The invention claimed is:

1. An apparatus for reprofiling a wheel set of a railway vehicle comprising:
   a milling station having one or more rollers supported on stationary brackets anchored to said milling station, the stationary brackets configured to prevent axial and radial translation of the one or more rollers relative to said milling station such that the one or more rollers rotate relative to the stationary brackets and support the wheel set while allowing the wheel set to rotate and while allowing a center of rotation of the wheel to move relative to the one or more rollers, the one or more rollers allowing the wheel set to rotate while cutting a wheel of said wheel set;
   a cutting tool operatively connected to the milling station, the cutting tool being moveable relative to said one or more rollers and positioned to mill a profile onto the wheel of the wheel set;
   a tracker connected to the milling station to track the position of the center of rotation; and
   a controller connected to said milling station and said tracker, the controller for controlling the position of the cutting tool relative to the center of rotation and to facilitate movement of the cutting tool towards a constant distance from the center of rotation.

2. The apparatus of claim 1 wherein the controller is configured to calculate a distance corresponding to the distance between the one or more rollers and the center of rotation.

3. The apparatus of claim 2 wherein the controller is configured to move the cutting tool based on said distance corresponding to the distance between the one or more rollers and the center of rotation.

4. The apparatus of claim 3 wherein the controller is configured to control the tracker to track the center of rotation after the cutting tool is activated to monitor the center of rotation.

5. The apparatus of claim 4 wherein the milling station comprises a mechanism configured to contact the wheel set and maintain the wheel set on said one or more rollers while allowing the center of rotation of the wheel to move relative to the one or more rollers.

6. The apparatus of claim 5 wherein the milling station is configured to support a wheel set removed from said railway vehicle.

7. The apparatus of claim 6 wherein the milling station is configured to support a wheel set attached to a bogie.

8. The apparatus of claim 6 further comprising:
   a second cutting tool operatively connected to the milling station, the second cutting tool being moveable relative to a second one or more rollers and positioned to mill a profile onto a second wheel of the wheel set;
   a second tracker connected to the milling station to sense the position of a center of rotation of the second wheel; and
   said controller being connected to said second tracker and being configured to control a position of the second cutting tool relative to the center of rotation of the second wheel to move the second cutting tool towards a constant distance from the center of rotation of the second wheel.

9. The apparatus of claim 6 comprising a probe connected to the milling station, said probe being configured to measure the geometry of the wheel to determine the center of rotation of the wheel and being operatively connected to said controller.

10. A method of reprofiling a wheel of a railway vehicle using the apparatus of claim 1, the method comprising:
    rotating a wheel set while allowing a center of rotation of a wheel of the wheel set to move vertically; and
    cutting the wheel to mill a profile on the wheel while moving the cutting tool towards the center of rotation of the wheel.

11. The method of claim 10 further comprising determining changes in position of the center of rotation while cutting the wheel and moving the cutting tool towards the center of rotation of the wheel based upon the changes in position of the center of rotation.

12. A method of reprofiling a wheel set of a railway vehicle using the apparatus of claim 1, the method comprising:
    disposing the wheel set on one or more rollers;
    determining a center of rotation of a wheel on the wheel set;
    determining a desired constant distance between a cutting tool and the center of rotation of the wheel;
    rotating the wheel while maintaining the one or more rollers in a fixed position;
    allowing the center of rotation of the wheel to move relative to the one or more rollers;
    activating the cutting tool to mill a profile on the wheel while allowing the center of rotation of the wheel to move relative to the one or more rollers; and
    moving the cutting tool towards the constant distance between the cutting tool and the center of rotation of the wheel.

13. The method of claim 12 further comprising tracking changes in position of the center of rotation of the wheel after the wheel has been rotated and the cutting tool has been activated.

14. The method of claim 13 further comprising measuring a distance corresponding to the distance between the one or more rollers and the center of rotation when the position of the center of rotation has changed.

15. The method of claim 14 wherein the cutting tool is moved in response to said measuring.

16. The method of claim 15 wherein the position of the center of rotation is monitored using a tracking device.

17. The method of claim 16 wherein the measuring a distance comprises measuring both the vertical and horizontal distances between the one or more rollers and the center of rotation.

18. The method of claim 17 wherein the wheel set is removed from said railway vehicle.

19. The method of claim 18 wherein the wheel set is attached to a bogie.

20. The method of claim 17 comprising measuring the geometry of the wheel using a probe system to determine the center of rotation of the wheel.

* * * * *